United States Patent Office.

WILLIAM J. RAND, OF BROOKLYN, E. D., NEW YORK.

Letters Patent No. 93,477, dated August 10, 1869.

IMPROVED PROCESS OF PREPARING ICELAND AND IRISH MOSS FOR USE IN FOOD.

The Schedule referred to in these Letters Patent and making part of the same.

*To all whom it may concern:*

Be it known that I, WILLIAM J. RAND, of the Eastern District of the city of Brooklyn, in the county of Kings, and State of New York, have invented a new and useful Process of Preparing Iceland Moss and Carrageen, (known in commerce as Irish moss,) for making *blanc-mange*, or other edible dishes, which constitutes a new manufacture; and I hereby declare that the following is a full, clear, and exact description of the same.

Iceland moss and carrageen are now used for making *blanc-mange*, puddings, and other articles of dessert, and have heretofore been sold in their natural state, or just as gathered, by the pound; but the amount of labor required to properly cleanse them and prepare them for the table, has prevented their general use.

As an article of diet, they are considered wholesome and highly nutritious, and as such they are ordered by physicians for invalids and convalescents.

The moss grows on and near the rocks by the sea-shore, and when gathered is covered with sand, dirt, and small pebbles, which it retains with great tenacity, its nature being gelatinous.

The stems of the moss contain but little nutriment, and are difficult to dissolve, disintegrate, or powder. The labor for the housekeeper to thoroughly cleanse it, and remove the stems, sand, dirt, and pebbles, is very considerable. The moss is also very bulky, so that not more than from forty to sixty pounds can be put into a common flour-barrel. This fact is also detrimental to its commercial value.

My invention consists of preparing it for commerce in a more portable form, and ready for use.

The process which I have successfully employed is as follows:

The moss is first cleaned by hand, or by suitable machinery, removing all the stems, sand, pebbles, grass, and dirt.

I next, by suitable machinery, disintegrate it, and then desiccate it by drying it on the floors of a kiln, or in a drying-room heated by steam-pipes, or other suitable means, at a temperature of from 140° to 160° Fahrenheit.

I sometimes use it in the disintegrated state, and at other times I grind it in a suitable mill, reducing it to a flour or fine powder.

I have three modes of putting it up ready for use.

My first mode is to put up the clear disintegrated or powdered moss in suitable papers or boxes.

My second mode is to mix in it the proper proportions with either sugar, corn-starch, farina, or any other suitable wholesome substance, which renders it palatable and suited to the different tastes of the public. The proportions may be varied, but I prefer it as follows: To ten ounces of moss, I add six ounces of sugar or other substance, and put up in suitable papers or boxes.

My third mode is to dissolve the moss in sugar, or some other substance, as above named, with the addition of a little water, making a solution of about the density of honey, or any other less or greater density, which I preserve by thorough desiccation, or by sealing it hermetically, and put in suitable papers or boxes.

I use the Iceland moss and carrageen either separately or mixed together, as demanded by the trade.

Having thus described my process, I desire to state that I do not confine myself to any positive or definite mode of putting up the moss for edible purposes; but

What I claim, and desire to secure by Letters Patent, is—

1. Both Iceland moss and carrageen, ground, powdered, cut up, shredded, or in any manner disinterated or dissolved, and prepared either in its natural state, or mixed with sugar, or any other edible substance or substances suitable for the purpose set forth, and put up in packages, for the convenience of the consumer and the trade, as a new commercial article.

2. The above-described processes, substantially as and for the purpose set forth.

WM. J. RAND.

Witnesses:
OSCAR COMSTOCK,
THOMAS TIBBALS.